United States Patent [19]
Baur et al.

[11] Patent Number: 5,631,765
[45] Date of Patent: May 20, 1997

[54] ELECTROCHROMIC LIGHT VALVE AND METHOD OF MANUFACTURING IT AS WELL AS ITS USE

[75] Inventors: Günter Baur; Peter Schlotter, both of Freiburg; Heinz Strinitz, Waldkirch; Uta Weinberg, Freiburg, all of Germany

[73] Assignee: Fraunhofer-Gesellschaft Zur Forderung der Angewandten Forschung E.V., Munich, Germany

[21] Appl. No.: 146,132
[22] PCT Filed: May 8, 1992
[86] PCT No.: PCT/EP92/01015
   § 371 Date: Nov. 12, 1993
   § 102(e) Date: Nov. 12, 1993
[87] PCT Pub. No.: WO92/21052
   PCT Pub. Date: Nov. 26, 1992

[30] Foreign Application Priority Data
May 16, 1991 [DE] Germany .......... 41 16 059.2

[51] Int. Cl.$^6$ .......... G02F 1/01
[52] U.S. Cl. .......... 359/274
[58] Field of Search .......... 359/265, 273, 359/274

[56] References Cited

U.S. PATENT DOCUMENTS 5,007,718  4/1991  Minoura et al. .......... 359/265

FOREIGN PATENT DOCUMENTS

| | | |
|---|---|---|
| 323006 | 12/1988 | European Pat. Off. . |
| 2633609 | 6/1988 | France . |
| 2924898 | 1/1980 | Germany . |
| 4010285 | 10/1990 | Germany . |
| 1233427 | 3/1988 | Japan . |
| 602984 | 8/1978 | Switzerland . |
| 2081922 | 8/1981 | United Kingdom . |
| 2164170 | 9/1985 | United Kingdom . |
| 2219099 | 5/1988 | United Kingdom . |
| WO9102282 | 8/1990 | WIPO . |

OTHER PUBLICATIONS

"Transmissive Electrochromic Device", Junichi Nagai et al., Solar Energy Materials, Nov. 1986, Nos. 3–5, pp. 175–183, Amsterdam, The Netherlands.

"Display Devices", Table of Contents, Springer–Verlag, N.Y. 1980.

*Primary Examiner*—Georgia Y. Epps
*Assistant Examiner*—Thomas Robbins
*Attorney, Agent, or Firm*—Sughrue, Mion, Zinn, Macpeak & Seas

[57] ABSTRACT

The invention makes available an electrochromic right valve (1) with an active electrochromic layer (2) and a passive electrochromic layer (3). Between the two electrochromic layers is an electrolyte (4). Each of the electrochromic layers is connected to an associated electrode (5, 6). The active electrochromic layer can accept electrons from its electrodes and ions of a particular element from the electrolyte to become reversibly colored. The passive electrochromic layer acts as a reservoir for ions of the species concerned, donating such ions to and accepting them from the electrolyte. At the operating temperature of the electrochromic light valve, the passive layer is super-saturated with the element which provides the ions of the species concerned. The invention also covers a method of manufacturing the electrochromic light valve and uses of the valve.

45 Claims, 1 Drawing Sheet

ELECTROCHROMIC LIGHT VALVE AND METHOD OF MANUFACTURING IT AS WELL AS ITS USE

BACKGROUND AND SUMMARY OF THE INVENTION

The invention relates to an electrochromic light valve with an active electrochromic layer, i.e. one whose colour can change, and a passive electrochromic layer, i.e. one whose colour essentially remains unchanged, between which an electrolyte is arranged and each of which is connected to an associated electrode, at least one of which is transparent, the coloration of the active electrochromic layer being reversibly changeable by acceptance or donation of electrons via its associated electrode and of ions of a particular element or several particular elements via the electrolyte, the passive electrochromic layer simultaneously donating ions of the species concerned of the element or the elements to the electrolyte or accepting them from the electrolyte.

The invention also relates to a method of manufacturing an electrochromic light valve of this kind in which a passive electrochromic layer is produced which contains at least one of the elements which provide the ions of the species concerned.

The invention also relates to particularly advantageous uses of this electrochromic light valve.

Electrochromic light valves are known, for example, from FR 2 633 609 A1, GB 2 081 922 A1, WO 91/02282, EP 0 323 006 A2 and DE 40 10 285 A1.

Electrochromic light valves of the kind described above can operate according to one of the following two alternative mechanisms:

a) The first alternative mechanism consists of the active electrochromic layer becoming coloured by accepting electrons from the electrode on one of its layer sides and positive ions from the electrolyte adjacent to its other layer side, the resulting depletion of positive ions in the electrolyte being compensated by the passive electrochromic layer supplying positive ions of the same element or another element to the electrolyte and simultaneously donating electrons to the outside via its electrode. This mechanism operates for example in an electrochromic light valve whose active electrochromic layer essentially consists of tungsten trioxide ($WO_3$) and in which the ions are lithium ions ($Li^+$) for example. This mechanism can also function with negative ions instead of positive ions, in which case when becoming coloured the active electrochromic layer donates negative ions to the electrolyte and the passive electrochromic layer accepts negative ions of the same element from the electrolyte.

b) The other alternative mechanism consists of the active electrochromic layer becoming coloured by donating electrons to the outside via its electrode and simultaneously accepting negative ions from the electrolyte via its interface with the electrolyte or donating positive ions to the electrolyte, the resulting ion depletion or ion excess in the electrolyte being compensated by the passive electrochromic layer donating ions of the species concerned of the same element or another element to the electrolyte and/or accepting them from the electrolyte and receiving electrons from outside in each case via its electrode. As an example of positive ions being donated when the active electrochromic layer is being coloured the literature quotes a system in which the active electrochromic layer essentially comprises iridium oxide ($IrO_x$) whilst acceptance of negative ions by the active electrochromic layer when being coloured takes place for example in a system in which this layer essentially comprises nickel oxide ($NiO_x$).

An electrochromic light valve of the kind described above, in which the active electrochromic layer can be reversibly coloured by accepting electrons from its electrode and positive ions of a particular element from the electrolyte, the passive electrochromic layer donating positive ions of the element to the electrolyte and/or accepting them from the electrolyte, is for example known from FR 2 633 609 A1 and the paper "Dip-coated $CeO_2$-$TiO_2$ films as transparent counter-electrode for transmissive electrochromic devices" by P. Baudry, A. C. M. Rodrigues and M. A. Aegerter, which is published in Proc. Vth Int. Workshop on Glasses and Ceramics from Gels, Rio de Janeiro, 6–10 Aug. 1989, and also from GB 2 081 922 A in a non-transparent form and with two active electrochromic layers instead of one active and one passive electrochromic layer.

In the electrochromic light valve described in the first two above-mentioned publications, the transparent active electrochromic layer comprises a transition metal oxide, preferably tungsten trioxide ($WO_3$), whilst the transparent passive electrochromic layer comprises a rare earth oxide, preferably cerium oxide ($CeO_u$ where u=2.3) or cerium-titanium oxide ($CeO_2$—$TiO_2$). An organic polymer conductive to lithium ions ($Li^+$) is preferably provided as the transparent electrolyte. In contrast, in the non-transparent electrochromic light valve according to GB 2 081 922 A the one active electrochromic layer comprises $WO_3$ and the other also active electrochromic layer comprises $Li_xWO_3$.

The mode of operation of a transparent electrochromic light valve which, as stated in FR 2 633 609 A1, is used in particular as a sunscreen window for buildings and vehicles, is as follows:

The tungsten trioxide layer can be coloured by applying an electrical voltage between the two electrodes, i.e. by generating an electric field between the electrodes. This coloration takes place by light-absorbing colour centres being produced by electrons being injected into the tungsten trioxide layer from its associated electrode. In order to be able to inject a sufficiently large number of electrons into the tungsten trioxide layer and hence to produce a sufficiently large number of colour centres in it the charge injected into the tungsten trioxide layer by the electrons must be compensated. This is achieved by positive ions (e.g. $H^+$, $Li^+$ or $Na^+$), in this case lithium ions, being simultaneously injected into the tungsten trioxide layer from the electrolyte. Similarly positive ions must be supplied Co the electrolyte from the passive electrochromic layer. Conversely, when the tungsten trioxide layer is de-coloured the passive electrochromic layer must be capable of accepting as many positive ions as need to be removed from the tungsten trioxide layer to de-colour it. This passive electrochromic layer comprising cerium oxide or cerium-titanium oxide therefore has the function of an ion acceptance and donation reservoir for the positive ions such as the lithium ions mentioned, for example.

In this case, as stated in FR 2 633 609 A1 for example, it is assumed that all the lithium can reversibly migrate to and fro between the active electrochromic layer comprising tungsten trioxide and the passive electrochromic layer comprising cerium oxide or cerium-titanium oxide, i.e. that all the lithium which is in the cerium oxide or the cerium-titanium oxide layer is available for the coloration of the tungsten trioxide layer.

It has now been found that in a transparent electrochromic light valve of this kind the degree or depth of coloration, i.e. the darkness or light absorption factor of the tungsten trioxide layer diminishes if the tungsten trioxide layer is subjected to a certain number of coloration cycles, e.g. 2,000 coloration cycles which are carried out at the same coloration voltage and for the same coloration time. And the degree of coloration does in fact diminish to a considerable extent so that a transparent electrochromic light valve of this kind which is designed as a light-absorbing windscreen ceases to be usable in practice, because with such a relatively low available number of approx. 2,000 coloration cycles it is not sensible in practice to fit a light-absorbing windscreen of this kind into a vehicle or the like.

In particular the object of the invention is to make available an electrochromic light valve of the above-mentioned kind in which the achievable degree of coloration is essentially maintained, i.e. does not decline substantially, despite an increasing service and storage duration.

DETAILED DESCRIPTION OF THE INVENTION

Figure 1:
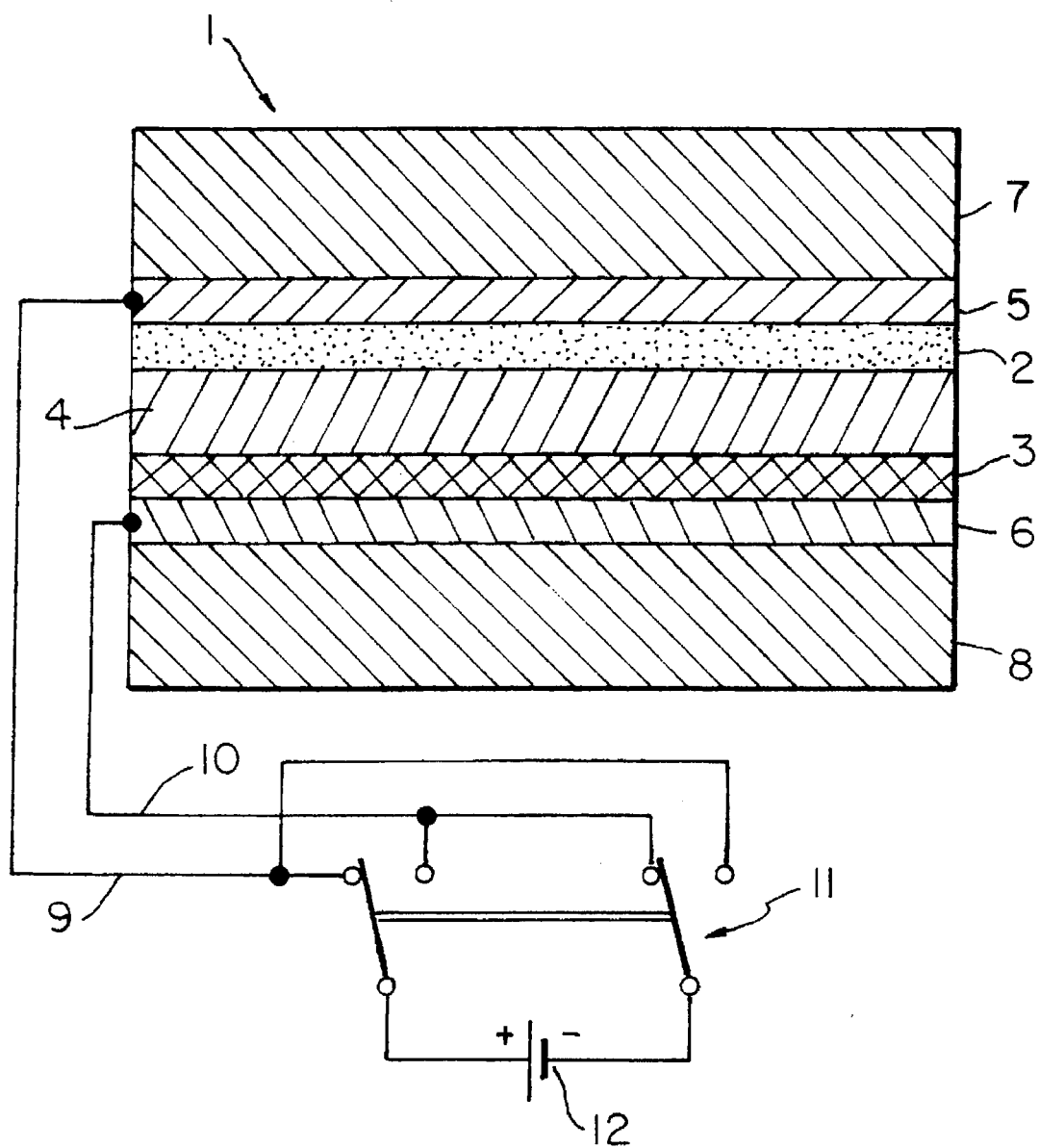
FIG. 1 is an illustration depicting an electrochromic device in accordance with the invention.

In the experiments which were carried out in the context of the invention it was surprisingly found that contrary to the previous opinion as disclosed in FR 2 633 609 A1, for example, the element which provides the ions of the species concerned in no way migrates to and fro completely reversibly between the active electrochromic layer and the passive electrochromic layer but that rather, as the number of switching cycles increases, only a fraction of the amount of this element which is present in the passive electrochromic layer is available for the coloration of the active electrochromic layer, whereas in contrast the majority of this amount has so little mobility at the operating temperature of the electrochromic light valve that it makes virtually no contribution to the coloration process. On the basis of the results of these experiments on which the invention is based, the above object is achieved according to the invention by the passive layer being supersaturated with the element which provides the ions of the species concerned or with the elements which provide the ions of the species concerned.

In the case of the light valves of the above-mentioned kind with a transparent passive electrochromic layer such as are described, for example, in FR 2 633 609 A1 and the above-mentioned paper by P. Baudry, A. C. M. Rodrigues and M. A. Aegerter, the opinion was that a typical $WO_3$ layer which is intended as an active electrochromic layer has a higher ion storage capacity than manufacturable and known transparent Ce-oxide layers or Ce—Ti oxide layers. It was therefore a problem to accept the Li-ions which are required for a desired degree of coloration of the $WO_3$ layer in the transparent Ce-oxide layer or Ce—Ti oxide layer, i.e. to accommodate enough Li-ions in it in order totally to de-colour a sufficiently deeply coloured $WO_3$ layer. According to the state of the art therefore it would have appeared absurd to saturate the Ce-oxide layer or the Ce—Ti oxide layer with Li, rather, with a completely coloured $WO_3$ layer, it should contain no Li at all if possible.

In contrast, in an electrochromic light valve of the non-transparent kind disclosed in GB 2 081 922 A in which an $Li_xWO_3$ layer which changes colour and is therefore active is provided instead of a passive Ce—Ti oxide layer, the acceptance and donation capability of this layer for Li-ions is not a problem at all because this layer does not have to be transparent and does not have to remain unchanged in terms of colour, i.e. does not have to be passive. This $Li_xWO_3$ layer can therefore easily be dimensioned in such a way that it is capable of donating and accepting sufficient Li-ions for the coloration and decoloration process of the active electrochromic $WO_3$ layer and therefore, in contrast to a light valve with an active and a passive electrochromic layer, the $Li_xWO_3$ layer in the light valve having two cooperating active electrochromic layers according to GB 2 081 922 A could be easily dimensioned in such a way as to form a more than adequate reservoir of Li-ions.

In the meaning of the invention supersaturation means that the passive electrochromic layer has a concentration of the element which provides the ions of the species concerned or the elements which provide the ions of the species concerned on the basis of which the passive electrochromic layer contains substantially more of the element or elements than ions thereof are donated to the electrolyte or accepted from the electrolyte when the active electrochromic layer is being coloured or de-coloured by the passive electrochromic layer at operating temperature and in a justifiable switching time.

In experiments on electrochromic light valves according to the invention in which the active electrochromic layer comprised tungsten trioxide and whose passive electrochromic layer was a $Ce_yTi_zO_u$ layer supersaturated with lithium at the operating temperature of the electrochromic light valve it was found that approximately twice to three times as much lithium as must be available for the maximum coloration of the tungsten trioxide layer is present in the $Ce_yTi_zO_u$ layer. On the basis of these experimental results it is assumed that in this system only approximately half to approximately a third of the amount of lithium present in the $Ce_yTi_zO_u$ layer has sufficient mobility at the operating temperature whilst the mobility of the remaining quantity of approximately a half to approximately two thirds of the lithium is so low that it makes no notable contribution to the coloration processes relevant in practice.

In the experiments that have been carried out in the context of the invention it was also surprisingly found that if indium-tin oxide layers (ITO layers) or tin oxide layers are used as transparent electrodes, these layers accept the ions used to colour the active electrochromic layer such as Li-ions, and do not completely release them again.

A particularly preferred embodiment of an electrochromic light valve according to the invention in which the electrode associated with the active electrochromic layer and/or the electrode associated with the passive electrochromic layer comprises indium-tin oxide or tin oxide or contains indium-tin oxide or tin oxide is therefore characterized according to the invention in that the indium-tin oxide or the tin oxide of the electrode associated with the active electrochromic layer and/or the indium-tin oxide or the tin oxide of the electrode associated with the passive electrochromic layer is saturated with the element which provides the ions of the species concerned or with the elements which provide the ions of the species concerned, such as with lithium and/or sodium for example.

In this case "saturated" means that the layer which forms the particular electrode, i.e. an ITO layer, contains so much of the element in question, e.g. Li, or the elements in question, e.g. Li and Na, that this layer essentially accepts none of the elements in question, e.g. no Li and/or no Na, in the course of the coloration and de-coloration process of the active electrochromic layer.

The method according to the invention of manufacturing an electrochromic light valve is characterized in that the passive electrochromic layer is supersaturated with the element which provides the ions of the species concerned, or with several elements which provide the ions of the species concerned.

An embodiment of the method according to the invention consists of the fact that in order to form the passive electrochromic layer, a carrier substance layer for an element which provides the ions of the species concerned, or for several elements which provide the ions of the species concerned, is initially manufactured, this carrier substance layer not containing or not being supersaturated with the above-mentioned element or elements, and that the element or elements is/are donated to this carrier substance layer until it is supersaturated.

An embodiment of this donation method consists of the fact that the carrier substance layer which does not contain the above-mentioned element or elements, or does not contain it/them to supersaturation, has this element or these elements donated in an electrolyte at a temperature substantially above the operating temperature of the light valve, until no further substantial acceptance of the element or elements takes place per unit of time. The donation is preferably carried out before the light valve is assembled.

When the operating temperature of the light valve is ambient temperature, this temperature at which the passive electrochromic layer is saturated and/or donated with the element which provides the positive ions is preferably in the range from 50° C. to 150° C., is therefore preferably a multiple of the operating temperature, related to an operating temperature quoted in plus degrees Celsius.

In this case the electrolyte is preferably so strongly doped with the element which provides the ions of the species concerned that it cannot act as the component that restricts the provision of the positive ions.

A preferred embodiment of the electrochromic light valve and the method of manufacturing it according to the invention is characterized in that the element which provides the positive ions is lithium and/or that the passive electrochromic layer comprises cerium oxide or contains cerium oxide and is supersaturated with $Li^+$, in particular comprises $CeTiO_u$ or contains $CeTiO_u$, and/or that the active electrochromic layer comprises a transition metal oxide or contains a transition metal oxide, in particular comprises $WO_u$ or contains $WO_u$, where u is in the range from 2 to 3, and is preferably 2.7.

The ion-active substance (carrier substance + element which provides the above-mentioned ions of the species concerned) of the passive electrochromic layer preferably essentially comprises $Li_xCe_yTi_zO_u$, the atomic ratio of lithium to cerium plus titanium, i.e. x:(y+z), preferably being approximately between 0.2 and 1, and/or essentially $Na_xCe_yTi_zO_u$, the atomic ratio of sodium to cerium plus titanium, i.e. x:(y+z), preferably also being approximately between 0.2 and 1. A passive electrochromic layer of this kind with $Li_{x1}Ce_{y1}Ti_{z1}O_{u1}$ and/or $Na_{x2}Ce_{y2}Ti_{z2}O_{u2}$ (here also the above atomic ratios of lithium to cerium and sodium to cerium are preferably present) can be used preferably in conjunction with the most varied active electrochromic layers, for example in conjunction with the active electrochromic layers quoted in this description and in the claims.

In an electrochromic light valve manufactured according to the invention which has a tungsten trioxide layer as the active electrochromic layer and a $CeTiO_u$ layer as the passive electrochromic layer with lithium or sodium as the element which provides the ions of the species concerned, there is, as emerged from the results of experiments conducted in the context of the invention, in the $CeTiO_u$ layer a substantially higher lithium or sodium concentration than is required for the desired and/or adequate coloration of the tungsten trioxide layer in normal operation, i.e. at the appropriate operating temperature, e.g. at ambient temperature.

As tests of fairly long duration have shown, the decrease in the achievable degree of coloration with an increasing operating and storage duration 0f the electrochromic light valve could be excluded in this way.

Polyvinylbutyral layer and/or polyvinylbutyral, which is doped with the element which provides the positive ions, is particularly preferred as the electrolyte. Polyvinylbutyral is particularly suitable as an ion conductor and has high chemical and mechanical stability, including when used in sunlight, among other things it does not yellow. When the polyvinylbutyral is doped with lithium as the element which provides the positive ions the donation preferably takes place in such a way that lithium perchlorate ($LiClO_4$) is dissolved in the polyvinylbutyrate.

A further preferred electrolyte of the electrochromic light valve according to the invention is a liquid crystal or a liquid crystalline polymer with preferred ion conductivity perpendicular to the layer plane. This liquid crystal or the liquid crystalline polymer is preferably of the nematic or discotic type.

The thickness of the active and/or the passive electrochromic layer is preferably between 0.05 and 10 μm.

Although, as stated above, it is particularly preferred that the passive electrochromic layer comprises $CeO_u$ or $CeTiO_u$ or contains $CeO_u$ or $CeTiO_u$, it may basically comprise one or more rare earth oxides or contain one or more rare earth oxides. Preferred embodiments of the passive electrochromic layer using cerium oxide are in particular those in which the passive electrochromic layer is a mixture of cerium oxide and 10 mol % to 90 mol %, preferably 50 mol %, of titanium(II), titanium(III) or titanium(IV) oxide or in which the passive electrochromic layer is a mixture of cerium oxide and 10 mol % to 90 mol % of tungsten oxide, preferably 20 mol % of tungsten oxide, the mol % values relating to the ratio of the metals and not to the ratio of the oxides.

Although lithium and/or sodium are preferred as the elements which provide the ions of the species concerned, other elements which provide positive or negative ions can also be used, such as hydrogen ($H^+$ ions) or potassium ($K^+$ ions) for example.

In this connection it should be stated that the method according to the invention can also be carried out so that the passive electrochromic layer is saturated with one or more elements, one of which is the specified element which provides the positive ions, preferably lithium and/or sodium, before the light valve is assembled and at a temperature substantially above the operating temperature of the light valve.

The method according to the invention can also be carried out in such a way that the active electrochromic layer is doped with the element which provides the ions of the species concerned up to a specified degree which is below saturation, before the light valve is assembled. In this way, overall an optimal donation of the electrochromic light valve according to the invention with the element which provides the ions of the species concerned is achieved in conjunction with the supersaturation of the passive electrochromic layer and a donation of the electrolyte with the above-mentioned element.

Generally speaking the passive electrochromic layer or its ion-active substance essentially comprises the element which provides the above-mentioned ions of the species concerned, or several elements of this kind, and a carrier substance for this element or these elements, the carrier substance generally being required because the element or elements in question, such as lithium and/or sodium for example, is/are not stable and not transparent when alone as an electrochromic layer. This carrier substance is preferably an amorphous or polycrystalline oxide or mixed oxide which ensures an adequate ion storage capacity and ion mobility for the element providing the ions of the species concerned or for the elements providing the ions of the species concerned.

Whilst in the above method a layer of the carrier substance is initially manufactured and the element in question or the elements in question is or are then donated to this layer, an alternative method of the invention for the manufacture of the passive electrochromic layer of the light valve according to the invention consists of the fact that the passive electrochromic layer is manufactured in a single process step by being simultaneously constructed from the element or the elements and the carrier substance for this element or these elements, this element or these elements being incorporated into this passive electrochromic layer when the passive electrochromic layer is being constructed, in a quantity such that the passive electrochromic layer is supersaturated with the said element or the said elements in the course of its construction.

In one embodiment of this method the passive electrochromic layer can be manufactured by means of sputtering or reactive sputtering from a target which contains the starting substances for the carrier substance and the element providing the ions of the species concerned or the elements providing the ions of the species concerned.

A preferred embodiment of this type of the method consists of the fact that the target consists of cerium and titanium from which an amorphous or poly-crystalline oxide or mixed oxide is produced in the reactive sputtering, and the element in question or the elements in question, for example lithium and/or sodium, so that for the above-mentioned case, for example, of an $Li_{x1}Ce_{y1}Ti_{z1}O_{u1}$ and/or $Na_{x2}Ce_{y2}Ti_{z2}O_{u2}$ layer a reactive sputtering from a metallic $Li_{x1}Ce_{y1}Ti_{z1}$ and/or $Na_{x2}Ce_{y2}Ti_{z2}$ target in an atmosphere containing oxygen or a neutral sputtering of a corresponding oxide target takes place.

A further embodiment of the above method according to the invention in which the supersaturated passive electrochromic layer is manufactured in a single process step consists according to the invention of the fact that the passive electrochromic layer is manufactured by simultaneous vapor deposition of the carrier substance layer and of the element later providing the ions of the species concerned or of the elements later providing the ions of the species concerned. An example of this form of carrying out the method consists of the fact that a simultaneous evaporation of compounds of the metals, of cerium and/or titanium for example, of which the carrier substance is constructed, and of the element in question or the elements in question takes place.

Finally a further kind of the embodiment of the method according to the invention for the manufacture of the above-mentioned supersaturated passive electrochromic layer consists of the fact that according to the invention the passive electrochromic layer is constructed from several individual layers which comprise a carrier substance and/or several carrier substances and/or the element or the elements or contain the above-mentioned constituents, which are manufactured over one another and after one another. In this case in particular individual layers which comprise carrier substance or contain carrier substance and individual layers which comprise the element or the elements or contain the element or the elements can be produced over one another in turns.

The above-mentioned individual layers can be produced both by neutral sputtering and/or reactive sputtering and by vapor deposition.

The electrochromic light valve according to the invention is preferably used in the form of window panes, optical components and spectacle lenses whose light transmission can be controlled by absorption and/or reflection. Further applications are as a controllable absorber and/or reflector in the solar field or as an electrically chargeable energy store. A further application of the electrochromic light valve according to the invention is as an electrically tunable medium in the resonator of a Fabry and Pérot interferometer, e.g. of the kind essentially known from GB 2 219 099 A.

The invention will be described in greater detail below with the aid of a preferred embodiment shown diagrammatically in cross-section in the only illustration of the drawing; it should be noted that for reasons of representation the drawing is not to scale.

The electrochromic light valve 1 shown in the drawing comprises an active electrochromic layer 2, which preferably comprises $WO_u$, where u is in the range from 2 to 3, preferably 2.7, and a passive electrochromic layer 3, which preferably comprises $Ce_yTi_zO_u$ or contains $CeTiO_u$, where u is in the range from 2 to 3.5, preferably 3.0. At the operating temperature of the electrochromic light valve 1 this passive electrochromic layer 3 is supersaturated with an element which provides ions of the species concerned, such as are used to colour the active electrochromic layer 3, preferably with lithium, it being possible for this supersaturation to be a multiple supersaturation.

Between the active electrochromic layer 2 and the passive electrochromic layer 3 is an electrolyte 4 connecting these two layers together, which is an ion conductor for the above-mentioned ions of the species concerned which are positive ions in this case, e.g. lithium ions. This electrolyte is preferably polyvinylbutyral which is doped with the element which provides the positive ions, in this case preferably lithium.

A first electrode 5 is provided on the side of the active electrochromic layer 2 facing away from the electrolyte 4 and a second electrode 6 is provided on the side of the passive electrochromic layer 3 facing away from the electrolyte 4.

On the outer sides of this layer construction is a first carrier layer 7 and a second carrier layer 8 which preferably comprise glass and/or plastic.

The de-coloured active electrochromic layer 2, the passive electrochromic layer 3, the electrolyte 4, the first and second electrode 5, 6 and the first and second carrier layer 7, 8 are transparent, i.e. they are permeable to light in a specified wavelength range or in several specified wavelength ranges. In this embodiment the electrodes 5, 6 are designed as indium-tin oxide layers which are saturated with the element providing the ions of the species concerned, preferably with lithium.

The two electrodes 5 and 6 are connected via a first and second line 9 and 10 and a two-pole changeover switch 11 to a voltage source 12 for the coloration and de-coloration of the active electrochromic layer 2, a short-circuiting of the two electrodes 5 and 6 also being capable of being provided for coloration and de-coloration purposes.

Optionally, the embodiment described can be modified for non-transmissive applications (e.g. controllable absorbers or reflectors) in such a way that one or more of the components 2 to 8 are not transparent in one or more wavelength ranges.

We claim:

1. Electrochromic light valve, comprising
   (a) a pair of electrodes, at least one of said electrodes being transparent;
   (b) an electrolyte layer arranged between said electrodes;
   (c) an active electrochromic layer whose color can change, said active electrochromic layer being interposed between one of said electrodes and said electrolyte layer;
   (d) an optically passive and transparent charge storage layer whose transparence remains essentially unchanged, said charge storage layer being interposed between the other of said electrodes and said electrolyte layer;
   (e) said active electrochromic layer being arranged and adapted for reversibly changing its coloration by acceptance and donation of electrons from and to said one electrode;
   (f) said active electrochromic layer for reversibly changing its coloration further being arranged and adapted for acceptance and donation of ions from and to said electrolyte;
   (g) said charge storage layer being arranged and adapted for donating and accepting ions from and to said electrolyte;
   (h) said charge storage layer further being arranged and adapted for donating and accepting electrons to and from said other electrode; and
   (i) said charge storage layer further being supersaturated with at least one of an element and a compound providing and accepting ions.

2. Electrochromic light valve according to claim 1, characterized in that the passive electrochromic layer (3) is multiply supersaturated with the element that provides the ions of the species concerned or with the elements that provide the ions of the species concerned.

3. Electrochromic light valve according to claim 1, characterized in that the element which provides the ions of the species concerned is lithium or sodium.

4. Electrochromic light valve according to claim 1, characterized in that the elements which provide the ions of the species concerned are lithium and sodium.

5. Electrochromic light valve according to claim 1, characterized in that the passive electrochromic layer (3) comprises cerium oxide or contains cerium oxide.

6. Electrochromic light valve according to claim 1, characterized in that the active electrochromic layer (2) comprises one transition metal oxide or several transition metal oxides or contains one transition metal oxide or several transition metal oxides.

7. Electrochromic light valve according to claim 1, characterized in that the thickness of the active and/or the passive electrochromic layer (2, 3) is between 0.05 and 10 µm.

8. Electrochromic light valve according to claim 1, characterized in that the electrolyte (4) is polyvinylbutyral, which is donated with the element which provides the positive ions or with the elements which provide the positive ions.

9. Electrochromic light valve according to claim 1, characterized in that the electrolyte (4) is a liquid crystal or a liquid crystalline polymer with preferred ion conductivity perpendicular to the film plane.

10. Electrochromic light valve according to claim 1, characterized in that the electrode (5) associated with the active electrochromic layer (2) and/or the electrode (6) associated with the passive electrochromic layer (3) comprises indium-tin oxide or tin oxide or contains indium-tin oxide or tin oxide, and that the electrode (5) associated with the active electrochromic layer (2) and/or that the electrode (6) associated with the passive electrochromic layer (3) is saturated with the element which provides the ions of the species concerned or with the elements which provide the ions of the species concerned.

11. Electrochromic light valve according to claim 5, characterized in that the passive electrochromic layer (3) is a mixture of cerium(III) and/or cerium(IV) oxide and 10 mol % to 90 mol %, of titanium(II), titanium(III) or titanium(IV) oxide, the mol % values relating to the Ce and Ti metal contents.

12. Electrochromic light valve according to claim 5, characterized in that the passive electrochromic layer (3) is a mixture of cerium(III) and/or cerium(IV) oxide and 10 mol % to 90 mol % of tungsten oxide, the mol % values relating to the Ce and W metal contents.

13. Electrochromic light valve according to claim 6, characterized in that the transition metal oxide is $WO_u$, where u is in the range from 2 to 3.

14. Electrochromic light valve according to claim 9, characterized in that the liquid crystal or the liquid crystalline polymer is of the nematic or discotic type.

15. Electrochromic light valve according to claim 14, characterized in that the electrode (5) associated with the active electrochromic layer (2) and/or the electrode (6) associated with the passive electrochromic layer (3) is saturated with lithium and/or sodium.

16. Method of manufacturing an electrochromic light valve according to one of claims 1 to 15, in which an optically passive and transparent charge storage layer, which contains at least one of an element and a compound providing and accepting ions, is produced, characterized in that the optically passive and transparent charge storage layer is supersaturated with the at least one of an element and a compound which provides and accepts the ions.

17. Method according to claim 16, characterized in that in order to form the supersaturated passive electrochromic layer (3), a carrier substance layer for an element which provides the ions of the species concerned, or for several elements which provide the ions of the species concerned, is initially manufactured, which does not contain the element or the elements or is not yet supersaturated with it/them, and that the element or elements is/are donated to this carrier substance layer until it is supersaturated.

18. Method according to claim 17, characterized in that the carrier substance layer which does not contain the element or the elements, or does not contain it/them to supersaturation, has this element or these elements donated in an electrolyte at a temperature substantially above the operating temperature of the light valve (1), until no further substantial acceptance of the element or the elements takes place per unit of time.

19. Method according to claim 17, characterized in that the donation is carried out before the light valve (1) is assembled.

20. Method according to claim 17, characterized in that the carrier substance layer, which does not contain the element or the elements or does not contain it/them to supersaturation, is doped by coating with the element or the elements and diffusion, the diffusion taking place at a temperature substantially above the operating temperature of the light valve (1).

21. Method according to claim 17, characterized in that the carrier substance is or contains an amorphous or polycrystalline oxide or mixed oxide.

22. Method according to claim 21, characterized in that the amorphous or polycrystalline oxide is cerium oxide or titanium oxide.

23. Method according to claim 21, characterized in that the amorphous or polycrystalline mixed oxide is $Ce_y Ti_z O_u$.

24. Method according to claim 21, characterized in that the mixed oxide is a mixture of cerium(III) and/or cerium (IV) oxide and 10 mol % to 90 mol % of titanium(II), titanium(III) or titanium(IV) oxide, the mol % values relating to the Ce and Ti metal contents.

25. Method according to claim 21, characterized in that the mixed oxide is a mixture of cerium(III) and/or cerium (IV) oxide and 10 mol % to 90 mol % of tungsten oxide the mol % values relating to the Ce and W metal contents.

26. Method according to claim 16, characterized in that the supersaturated passive electrochromic layer (3) is manufactured in a single process step by being simultaneously constructed from the element or the elements and a carrier substance for this element or these elements, this element or these elements being incorporated into this layer (3) when the layer (3) is being constructed, in a quantity such that the layer (3) is supersaturated with the element or the elements in the course of its construction.

27. Method according to claim 26, characterized in that the passive electrochromic layer (3) is manufactured by means of sputtering or reactive sputtering of a target which contains the starting substances for the carrier substance and the element or the elements.

28. Method according to claim 26, characterized in that the passive electrochromic layer (3) is manufactured by simultaneous vapor deposition of the carrier substance layer and the element or the elements.

29. Method according to claim 27, characterized in that the target is a metallic target which contains or consists of cerium and/or titanium and lithium and/or sodium and the reactive sputtering is carried out in an atmosphere containing oxygen.

30. Method according to claim 29, characterized in that the target contains or comprises $Li_{x1} Ce_{y1} Ti_{z1}$ and/or $Na_{x2} Ce_{x2} Ti_{z2}$.

31. Method according to claim 27, characterized in that the target contains or consists of cerium oxide and/or titanium oxide and lithium and/or sodium.

32. Method according to claim 31, characterized in that the target contains or consists of $Li_{x1} Ce_{y1} Ti_{z1} O_{u1}$ and/or $Na_{x2} Ce_{y2} Ti_{z2} O_{u2}$.

33. Method according to claim 16, characterized in that the passive electrochromic layer (3) is constructed from several individual layers of a carrier substance or several carrier substances and/or the element or the elements which are manufactured over one another and after one another.

34. Method according to claim 33, characterized in that individual layers of carrier substance(s) and individual layers of the element or the elements are produced over one another in turns.

35. Method according to claim 33, characterized in that the individual layers are produced by sputtering and/or reactive sputtering.

36. Method according to claim 33, characterized in that the individual layers are produced by vapor deposition.

37. Method according to claim 16, characterized in that the element is lithium or sodium.

38. Method according to claim 16, characterized in that the elements are lithium and sodium.

39. Method according to claim 16, characterized in that the passive electrochromic layer (3), preferably before the light valve (1) is assembled, is provided, in particular saturated and/or doped in the manner stated, with another element of any other kind or with several elements of any other kind.

40. Method according to claim 16, characterized in that the active electrochromic layer (2), preferably before the light valve (1) is assembled, is provided, in particular doped, with an element which provides the ions of the species concerned or with several elements which provide the ions of the species concerned, up to a specified degree below the saturation limit.

41. Method according to claim 16, characterized in that the electrode (5) associated with the active electrochromic layer (2) and/or the electrode (6) associated with the passive electrochromic layer (3) is saturated with the element which provides the ions of the species concerned or with the elements which provide the ions of the species concerned.

42. Method according to claim 41, characterized in that the electrode (5) associated with the active electrochromic layer (2) and/or the electrode (6) associated with the passive electrochromic layer (3) is saturated with lithium and/or sodium.

43. Use of the electrochromic light valve manufactured according to claim 16 as windowpanes, optical components and spectacle lenses whose light transmission is controllable by absorption and/or reflection.

44. Use of the light valve manufactured according to claim 16 as a controllable absorber and/or reflector in the solar field or as an electrically chargeable energy store.

45. Use of the electrochromic light valve manufactured according to claim 16 as an electrically tunable medium in the resonator of a Fabry and Pérot interferometer.

* * * * *